United States Patent Office 3,200,666
Patented Aug. 17, 1965

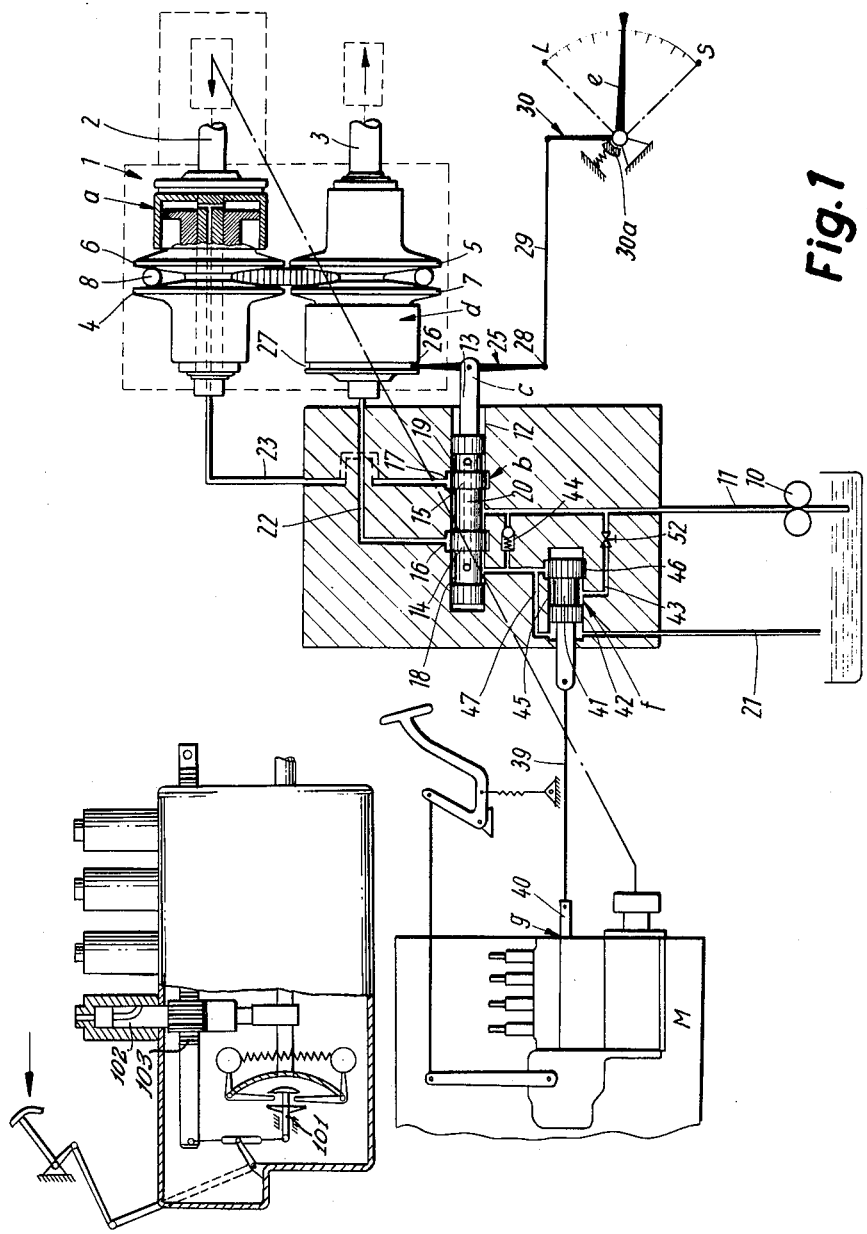

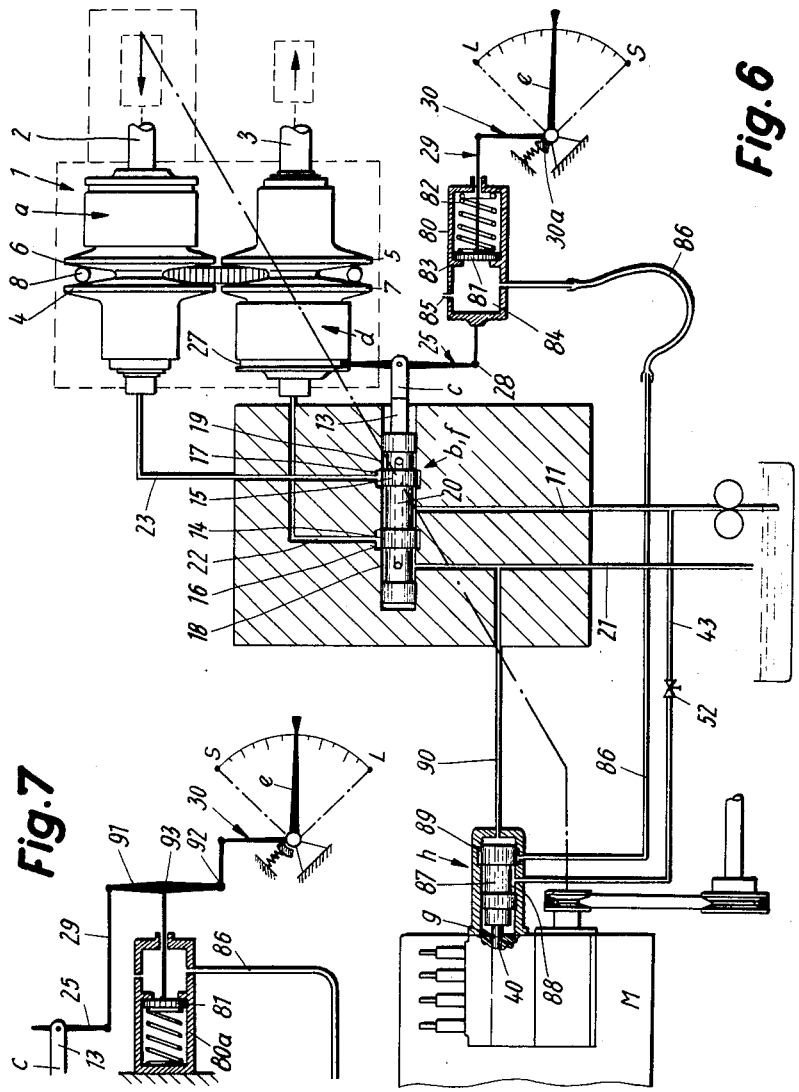

3,200,666
CONTROL MECHANISM FOR A DRIVING UNIT CONSISTING OF A DRIVING ENGINE AND AN INFINITELY VARIABLE GEAR
Rudolf Schrodt, Kronberg, and Erich Petersen, Bad Homburg vor der Hohe, Germany, assignors to Reimers Getriebe K.G., Ascona, Switzerland, a firm of Switzerland
Filed July 12, 1961, Ser. No. 123,543
Claims priority, application Germany, Aug. 4, 1960, R 28,483
10 Claims. (Cl. 74—472)

The present invention relates to a control mechanism for the operation of a driving unit which consists of a driving engine with an automatic output control and an infinitely variable transmission which is connected to the engine and the adjusting element of which is to be supplied with a bracing force which is adapted to maintain and vary a freely selected transmission ratio and is variable with a change in the transmission ratio or in the load acting upon the transmission or in both, and which is produced by an adjusting mechanism which is preferably operated hydraulically, but may, of course, also be operated pneumatically. When speaking herein of "output control," this term should also be understood to mean the speed control of the engine at a constant engine torque or the engine torque control at a constant engine speed.

It is the principal object of the invention to provide a control mechanism which complies with the following conditions:

(a) The transmission should be arbitrarily adjustable to any desired transmission ratio;

(b) After being once adjusted, the transmission ratio of the transmission should remain constant even though the load upon the engine varies between idling and an upper limit;

(c) When the admissible load upon the engine is reached, the transmission ratio of the transmission should be changed automatically to such an extent that the admissible load will not be exceeded even though the engine not only drives the transmission, but also other apparatus (for example, farm tractors with a power take-off).

(d) If the load upon the engine sinks below the admissible load, the transmission should be automatically and immediately readjusted to the transmission ratio which was originally set.

(e) The automatic adjustment of the transmission ratio of the transmission within the range of the admissible load upon the engine should occur smoothly without vibrations, and without delay;

(f) The admissible load upon the engine at which the automatic adjustment of the transmission ratio of the transmission should occur should be freely selectable.

(g) It should be possible to put the automatic adjustment of the transmission ratio of the transmission arbitrarily out of action.

The infinitely variable gears to which the invention relates are presumed to be of the type which for maintaining and varying the transmission ratio of the transmission requires a bracing force to be produced which depends upon the prevailing load upon the transmission or its prevailing transmission ratio or both. Such transmissions have the tendency to step down automatically to a lower speed when they are subjected to a greater load. They have, on the other hand, the advantage that they may be subjected to very great loads and may be built with a small power-to-weight ratio, and that they are therefore very suitable for motor vehicles. They are especially desirable for farm tractors or similar vehicles with built-on or attached additional machines which are driven by the vehicle engine by means of a power take-off. Such vehicles usually have to be used under considerably varying operating conditions, for example, for driving on a road, for drivnig in the field with an implement built on or attached thereto, for example, a plow which is not driven by the power take-off, or for driving in the field with an implement built-on or attached thereto, for example, a harvester, a stacker, or the like, which also has to be driven by the vehicle engine through the power take-off of the latter.

If the above-mentioned object of the invention may be attained under such varying and severe conditions, then there can be no question that it will also be attained under less severe conditions.

With a driving unit of the mentioned kind and under the mentioned conditions regarding the properties of the transmission, the above-mentioned object of the invention will be attained by providing a pressure medium to produce a bracing force which acts upon a hydraulic or pneumatic piston, and by regulating the pressure of this medium by means of a pressure-regulating valve, the control element of which is connected, on the one hand, to the adjusting element of the transmission for the purpose of automatically adjusting the bracing force so as to counteract any change in the transmission ratio of the transmission which is caused by a change in load and, on the other hand, to a control element which may be arbitrarily adjusted for varying the transmission ratio of the transmission to any desired extent. The invention further consists in the provision of a control element in the form of a release valve, in operatively connecting this valve with a control member of the output control device of the engine, possibly by the addition of intermediate servo means, and in the provision of means for adjusting this release valve by the action of the mentioned control member when the admissible load upon the engine is reached so as to reduce the pressure of the pressure medium which determines the bracing force.

Since the automatic adjustment of the transmission ratio of the transmission which is thus attained is directly dependent upon the load acting upon the driving engine, this adjustment is extremely sensitive, and by a suitable selection of the admissible maximum load it is possible to insure that the engine will always operate at a maximum efficiency and will not stall even though the load might be suddenly increased.

The direct dependency of the control mechanism according to the invention upon the load acting upon the engine (rather than upon the torque required on the driven shaft of the transmission, for example, on the driving wheels of a motor vehicle) has the following very important advantages:

(a) The kinetic energy of the centrifugal masses of the engine may now be utilized.

(b) If a vehicle, for example, a farm tractor, is operated which has a power take-off, not only the part of the engine torque which is required for driving the vehicle is being controlled by the control mechanism according to the invention, but also the other part of the torque—which might even constitute the larger part—which does not pass through the transmission but directly through the power take-off.

(c) The control mechanism according to the invention protects the engine from being overloaded, even though its efficiency might be reduced by being over-age or slightly defective.

(d) The admissible engine output may be fully utilized without any necessity to provide for any reserve power of the engine for the purpose of arbitrarily carrying out any changes in transmission ratio which might be suddenly required.

(e) The control mechanism according to the invention assists in quick accelerating procedures since upon the occurrence of a sudden full load upon the engine it answers immediately with a temporary step-down adjustment of the transmission ratio.

The release valve which is operatively connected with the control member of the output control device of the engine is preferably provided in the form of a slide valve, the cylinder of which is supplied with the pressure medium which produces the bracing force. When the maximum output of the engine is being exceeded, this slide valve partly opens a return line for the pressure medium so that the pressure thereof and thus the bracing pressure decreases and the infinitely variable transmission will be adjusted to a lower transmission ratio. The release valve may then be arranged in shunt either to the line which conducts the pressure fluid from the pump to the pressure-regulating valve or to the line which conducts the pressure medium to the hydraulic or pneumatic piston which produces the bracing force. A very simple construction will be attained if the slide-valve member of the release valve is mechanically connected to a longitudinally movable control rod of the output control device of the driving engine.

On the other hand, it is also possible to connect the control member of the output control device to an auxiliary control member of a servo element for adjusting the release valve in accordance with the position of the auxiliary control member. The servo element may be of many different designs. In any event, however, for operating the release valve a force is applied which is not directly derived from the circuit which is controlled by the release valve and supplies the medium which produces the bracing pressure.

According to another embodiment of the invention, the control mechanism may also be designed so that the control member of the output control device of the engine and the auxiliary control member are adjustable by the vacuum prevailing in the intake pipe of the engine, and that the auxiliary control member which may consist in the conventional manner of a diaphragm or piston governor acts upon the release valve. A further preferred embodiment of the servo means consists in providing the auxiliary control member in the form of an auxiliary control piston which is connected to the control member of the output control device of the engine and which by its position controls the pressure of a pressure medium which acts upon the release valve against the pressure of a spring. The auxiliary control member may, however, also be provided in the form of an electric switch which is actuated by the control member of the output control device and controls an auxiliary electric circuit containing a solenoid which, when energized, moves the release valve which is in the form of a control piston. The arrangement may advantageously also be modified so that the auxiliary control member forms an auxiliary control piston which is connected to the control member of the output control device and by its position controls the pressure of a pressure medium which acts upon a spring-loaded piston. This spring also acts upon the valve member of a pressure relief valve forming the release valve, and it thus determines the amount of pressure required to open the release valve in accordance with the position of the spring-loaded piston. According to a further modification of the invention, the pressure medium which is supplied to the auxiliary control member may, when the admissible load upon the engine is exceeded, be passed by an auxiliary slide valve which is actuated by the control member of the output control device to a servo cylinder, the piston of which is slidable therein against the action of a spring and is connected to a part of a connecting-lever system which is operated by a manual control lever so that, while the setting of this control lever remains unchanged, the pressure regulating valve which also forms a release valve will be adjusted so as to produce a reduction of the transmission ratio of the transmission. In this case, the servo cylinder may form a connecting element of the connecting lever system which is actuated by the hand lever for changing the transmission ratio, or the arrangement may be so designed that a two-armed lever of the connecting lever system, which is actuated by the mentioned hand lever, is pivotably mounted on the piston rod of the piston which is slidable within the servo cylinder which in this case is mounted in a fixed position.

These and further objects, features, and advantages of the present invention will become more clearly apparent from the following detailed description thereof, particularly when the same is read with reference to the accompanying drawings, in which—

FIGURE 1 shows diagrammatically and partly in cross section a first embodiment of the control mechanism according to the invention in connection with an infinitely variable transmission consisting of two pairs of cone pulley disks connected by a belt or chain;

FIGURE 2 shows a detail of a part of FIGURE 1;

FIGURE 6 shows a sixth embodiment in a manner as illustrated in FIGURE 1;

FIGURE 7 shows a modification of a part of the embodiment according to FIGURE 6; while

Figure 3:
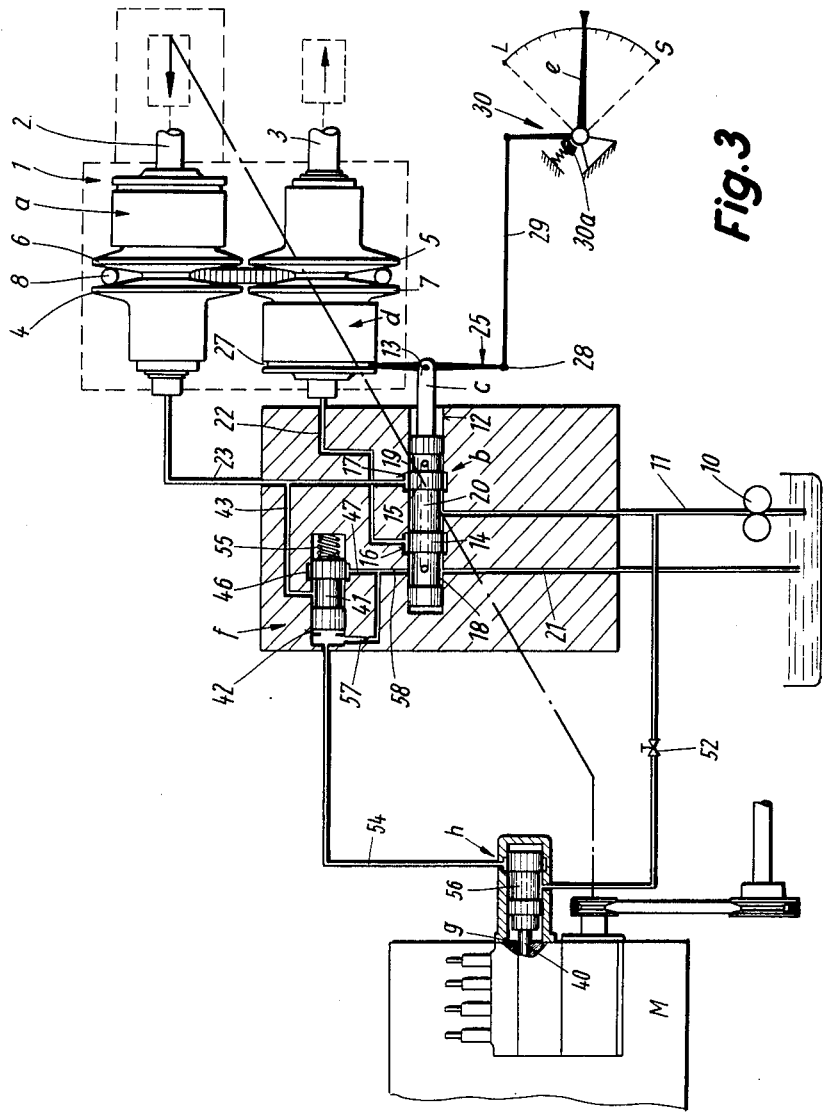
FIGURE 3 shows, similarly as illustrated in FIGURE 1, a third embodiment of the invention.

In order to facilitate the explanation and understanding of the invention, all of those parts of the different embodiments of the invention which are structurally similar and are also intended to carry out similar functions are indicated in the following description and in all of the accompanying drawings by the same reference numerals.

Referring first to FIGURES 1 to 7 of the drawings, the control mechanism according to the invention is illustrated in connection with an infinitely variable transmission of a conventional type, generally indicated at 1, which consists of a pair of transmission shafts 2 and 3, each of which carries a cone pulley consisting of a pair of conical disks 4, 6 and 5, 7, respectively, and of an endless belt or chain 8 (hereafter simply referred to as a "belt") which connects the two cone pulleys for transmitting a driving force from one of the transmission shafts to the other. In the embodiments of the invention as illustrated in FIGURES 1 to 7, shaft 2 is presumed to be the drive shaft and shaft 3 the driven shaft to the transmission. One conical disk 4 or 5 is rigidly secured to each shaft 2 shaft and shaft 3 the driven shaft of the transmission. the respective shaft in the axial direction thereof. By increasing the distance between the two disks on one shaft 2 or 3 for a certain amount and by reducing the distance between the two disks on the other shaft for a corresponding amount, it is possible to adjust the transmission to various transmission ratios. For producing the necessary forces which have to be exerted upon the axially movable disks 6 and 7 to transmit the driving force from drive shaft 2 to the driven shaft 3 by friction between the two pairs of disks of each pulley and the belt 8, different means may be provided which are not particularly illustrated in the drawings since they may be of any conventional type and do not form a feature of this invention. They may, for example, be of the type shown in Dittrich Patent No. 3,052,132. These pressure-exerting means press the movable disk 7 on the driven shaft 3 toward the fixed disk 5 and against the belt 8 with a force which depends upon the prevailing load acting upon this shaft and also upon the adjusted transmission ratio of the transmission. Thus, the belt will at all times run between the two pulleys substantially without slipping. At the driving side of the transmission a bracing force (that is, a force opposing the motion of the pulley disc which the tension of the belt tends to produce) must be applied to prevent the movable disk 6 from yielding under the tension of the belt which would result in an undesired change of the transmission ratio. This bracing force is produced hydraulically for which purpose the axially movable disk 6 is designed so as to form a hydraulic piston $a$ as indicated in FIGURE 1, upon which a hydraulic pressure is exerted which is produced by a pump 10 and controlled by a pressure-regulating valve $b$. This pressure-regulating valve $b$ which is supplied with a pressure fluid by pump 10 through a pressure line 11 consists according to the invention of a stationary cylinder 12 in which a control element $c$ is slidably mounted which consists of a control rod 13 with a pair of control pistons 14 and 15 thereon. Control pistons 14 and 15 are slidable within cylinder 12 relative to a pair of annular recesses 16 and 17 in cylinder 12, each of which has a width only slightly greater than the width of the respective piston 14 or 15. When the two pistons are in their central position, the flow of pressure fluid supplied by pump 10 and entering into the annular chamber between pistons 14 and 15 will be throttled and enter into the annular recesses 16 and 17 from which it will then pass into the annular chambers 18 and 19. Chamber 19 is connected with a return line 21 by a longitudinal bore 20 in control rod 13, while chamber 18 is connected directly with return line 21 to discharge the fluid from these chambers without pressure. Thus, a fluid pressure is built up in recesses 16 and 17 which depends upon the particular position of control pistons 14 and 15, and the pressure in each recess is transmitted through separate lines 22 and 23 to the two hydraulic pistons $a$ and $d$ which press the slidable pulley disks 6 and 7 with an axial force in accordance with the fluid pressure against the belt 8 and the latter against the fixed pulley disks 4 and 5, respectively.

If the control rod 13 and the two control pistons 14 and 15 thereon are shifted slightly toward the right, as viewed in FIGURE 1, the pressure fluid passing from pump 10 through line 11 enters more easily into the annular recess 17, while at the same time the amount of fluid discharged from this recess into the annular chamber 19 is throttled. The result hereof is an increase in pressure in line 23 which leads to the hydraulic piston $a$ which presses upon the conical disk 6. At the same time, control piston 14 throttles the passage of pressure fluid to the annular recess 16 and facilitates the discharge of the fluid from recess 16 into the annular chamber 18 from which the pressure is released through line 21. Consequently, the pressure in line 22 leading to the hydraulic piston which acts upon the conical disk 7 will be almost zero.

Assuming that the infinitely variable transmission 1 as illustrated in FIGURE 1 is driven at its shaft 2 by an internal combustion engine M, and that a load output torque is applied on its driven shaft 3, the pressure-applying means, not shown, will produce a bracing force on the driven shaft 3 which is dependent upon the torque and the particular adjusted transmission ratio of the transmission and presses the conical disk 7 toward the conical disk 5 and against belt 8 with the necessary force to transmit the driving force by friction between the two disks and the belt. This will result in an increase in diameter of belt 8 between disks 5 and 7 which, in turn, would mean that the belt would have to pass more deeply between the other pair of disks 4 and 6 and that the transmission ratio would be unintentionally reduced. In order to prevent this undesired effect, a two-armed lever 25 is pivotably connected to control rod 13, and one end 26 of this level engages into an annular groove 27 in the axially slidable disk 7 and thus follows every axial movement of disk 7. The other end 28 of lever 25 is pivotably connected through a connecting rod 29 to a control member $e$ in the form of a bell crank 30, the free end of which serves as a control handle for varying the transmission ratio to the extent which may be desired. Assuming, for example, that bell crank 30 is held arrested in the position as illustrated in the drawings by a brake 30a, the slightest yielding movement of the slidable pulley disk 7 toward the right will immediately result in a very steep rise in pressure in line 23 and thus in an increase of the hydraulic bracing force acting upon disk 6, whereby any further yielding movement of disk 7 will be prevented. If the equilibrium between the bracing force which is hydraulically produced and the spreading force which is produced by belt 8 is disturbed by a change in the load acting upon the driven shaft 3, an extremely small yielding movement of the slidable disk 7 will suffice to restore the equilibrium of forces by the operation of the pressure-regulating valve $b$. The change in transmission ratio which may hereby occur is so small that it may properly be said that, after the transmission ratio is once adjusted, it will even at changes in load be kept constant by the pressure-regulating valve $b$.

If bell crank 30 is pivoted, the position of the two control pistons 14 and 15 relative to the two annular recesses 16 and 17 will be consequently changed with the result that the fluid pressures in lines 22 and 23 will be radically changed and disks 6 and 7 will carry out a yielding movement until the transmission has been adjusted to the desired new transmission ratio. The yielding movement of disk 7 is then also transmitted through lever 25 to the control pistons 14 and 15 which are thus returned to their normal central position relative to recesses 16 and 17 so as to restore the equilibrium of forces at the new transmission ratio in the manner as above described.

The mode of operation of the pressure-regulating valve $b$ in connection with transmission 1 and control member $e$ for varying the transmission ratio as desired is basically the same in all of the embodiments as shown in the drawing and these elements are therefore identified in FIGURES 1 to 8 by the same numerals and do not need to be again described in detail.

The control mechanism—insofar as it has been previously described—permits any desired transmission ratio to be arbitrarily selected and easily varied by means of the control member $e$ and also to be automatically maintained at the adjusted value even though the load might change on the driven shaft 3. This operation is desirable as long as the load acting upon the transmission and thus also upon the driving engine does not exceed a certain limit. If this occurs, however, the invention further provides that the transmission should be capable of automatically changing its ratio downward to such an extent that a certain admissible load limit upon the engine will not be exceeded.

As a measure for determining the admissible load upon the engine it is possible to rely upon the particular position of a control member $g$ of the output control device of the engine, that is, for example, the position of the control rod of the injection pump. The control rod is, for example, automatically positioned in a known manner in accordance with the load on the engine to maintain the speed or the torque thereof constant. This is illustrated in FIGURE 1, in which the control rod 40 of the engine M is connected by a connecting rod 39 to a release valve $f$ which consists of a side valve 41 which is slidable longitudinally within a cylinder 42. This cylinder 42 is supplied through a pressure line 43 which branches off the pressure line 11 with the same fluid pressure which also enters into the annular chamber between the control pistons 14 and 15 of the pressure-regulating valve $b$. This pressure may be limited in a conventional manner by the pressure relief valve 44 as illustrated.

The valve member 41 of release valve $f$, as shown in FIGURE 1, is provided with an annular recess 45 which, when the valve member is shifted toward the right as the result of the injection of an increasing quantity of fuel, communicates with an annular recess 46 in cylinder 42 so that the pressure fluid can flow off more or less throttled through the return line 47 which communicates with the return line 21.

When the injection-pump governor 101 (FIG. 2) shifts the control rod 40 toward the right in accordance with a decreased output speed and thereby increases more and more the quantity of fuel injected, by turning piston valve 102 through rack 103 the annular recess 45 in valve member 41 will finally, when the engine is subjected to a certain admissible load and when the maximum quantity of fuel is injected, just come into contact with the annular recess 46 in cylinder 42 so that a reduction in pressure will occur in lines 11 and 43. This pressure reduction also acts upon the fluid pressure in line 23 which leads to the hydraulic piston $a$ so that the equilibrium between the spreading forces and bracing forces will then be disturbed and the transmission can change to a smaller transmission ratio. The result of this is that the driven shaft 3 will then deliver substantially the maximum output of the engine in the form of a lower speed but at an accordingly increased torque. If this increased torque is still not sufficient, the output control device of the engine will tend to inject a still greater quantity of fuel with the result that the pressure in pressure lines 11 and 43 will be further reduced and with the further result that the transmission ratio of the transmission will be still further reduced until finally the torque delivered corresponds to the required torque. This shows that the control mechanism according to the invention prevents a certain admissible load limit of the driving engine from being exceeded as long as the infinitely variable transmission is capable of reducing its transmission ratio.

If the torque on the driven shaft 3 of the infinitely variable transmission decreases, the output control device of the engine will immediately reduce the quantity of fuel injected, with the result that the passage of the pressure fluid from the annular recess 45 of slide valve 41 into the annular recess 46 of cylinder 42 will be interrupted and the original pressure conditions will again be built up, which means that the transmission will immediately return to its transmission ratio as originally set.

In order to prevent this effect of slide valve 41, it is merely necessary to provide a shutoff valve 52 in pressure line 43.

Since in the gear according to FIGURE 1 the slidable disks 6 and 7 on shafts 2 and 3 are each equipped with a hydraulic piston, it is also possible to exchange the driving and driven sides of the transmission, that is, to connect the engine M to shaft 3 and the load to shaft 2. The pressure-regulating valve $b$ will then operate in the manner as described when control rod 13 is shifted toward the left. The effect of the release valve $f$ remains the same. As illustrated, the pressure-regulating valve $b$ and the release valve $f$ may be mounted within a common housing.

The release valve $f$ is shunted to line 11 which passes the pressure fluid from pump 10 to the pressure-regulating valve $b$ so that, if the admissible load upon the engine is being exceeded, the fluid pressure supplied to the pressure-regulating valve $b$ will be reduced.

FIGURE 3 shows a further modification of the invention in which the release valve $f$ is again arranged behind the pressure-regulating valve and provided in the form of a slide valve 41 which is slidable within a cylinder 42. Slide valve 41 is acted upon by a compression spring 55 which opposes the pressure of a pressure fluid which is likewise supplied by a pump 10 and conducted to an auxiliary control element $h$ in the form of an auxiliary slide valve 56 which is directly connected to the control rod 40 of a control element $g$ which regulates the amount of fuel to be injected. As long as the load capacity of the engine is not reached, the auxiliary slide valve 56 will hold the line 54, which leads to cylinder 42 and to slide valve 41, in the closed position. Spring 55 therefore presses the slide valve 41 toward the left against the stop, in which position the release valve $f$ is closed. Any possible fluid which might be contained in the cylinder chamber at the left side of slide valve 41 may then flow off through a throttling bore 57 and the return lines 58 and 21. If the engine exceeds its normal output, the auxiliary slide valve 56 will open and allow the pressure fluid to pass into line 54 and then into cylinder chamber 42 so that in the latter a pressure is built up which depends upon the position of the auxiliary slide valve 56 and the size of the throttling opening 57 and which shifts slide valve 41 toward the right against the action of spring 55.

The release valve $f$ is thereby opened at least to some extent and the pressure in lines 23 and 42 which acts upon the hydraulic piston $a$ is reduced so that the transmission will be automatically changed to a lower transmission ratio. If a suitable servo device is provided, the forces for actuating the auxiliary control element $h$ may therefore be kept very small and the action upon the control element $g$ of the power control means of the engine will therefore also be very small.

Figure 4:
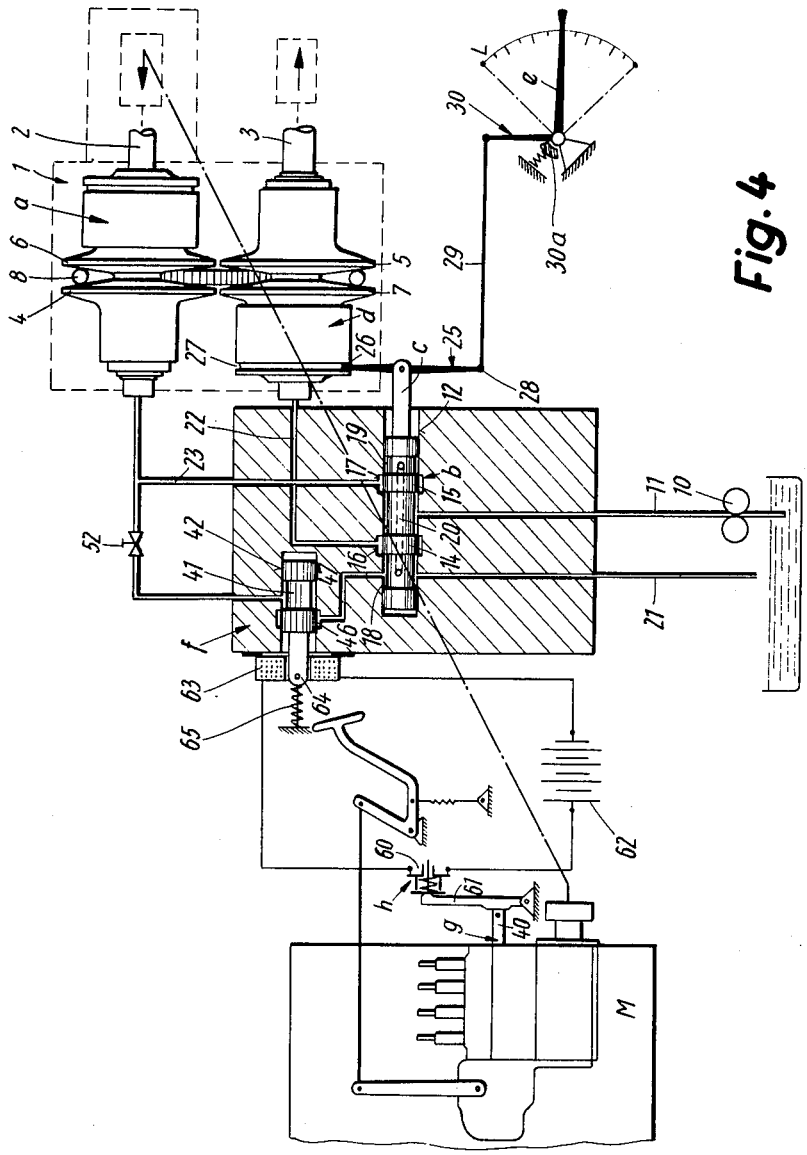
FIGURE 4 shows a fourth embodiment, also in a manner as illustrated in FIGURE 1.

FIGURE 4 illustrates a further modification of the invention which is similar to the embodiment according to FIGURE 3, except for the design of the servo device. The auxiliary control element $h$ is in this case designed in the form of an electric switch 60 which is closed by the control element $g$ of the power control means, that is, by the control rod 40 of the injection pump through a pivotable lever 61 when the admissible load upon the engine is reached. The closing of switch 60 closes the circuit of a solenoid 63 which is energized by a battery 62 and then draws the end 64 of slide valve 41, which forms an armature, against the action of a spring 65 into solenoid 63, whereby the release valve $f$ will be opened.

Figure 5:
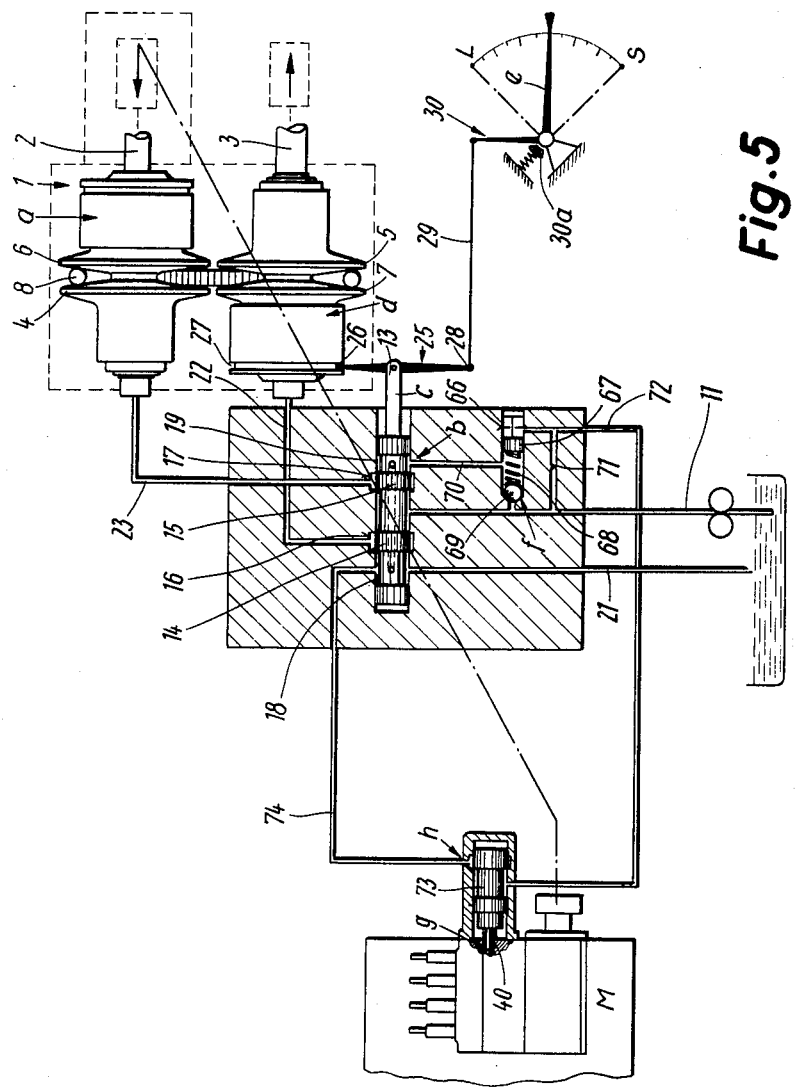
FIGURE 5 shows a fifth embodiment in a manner as illustrated in FIGURE 1.

FIGURE 5 shows another modification of the control mechanism according to the invention, in which the construction of transmission 1 and of the pressure-regulating valve $b$ corresponds exactly to the construction as described with reference to FIGURE 1. The release valve $f$ is, however, of a different construction. Pressure line 11 leading from pump 10 to the pressure-regulating valve $b$ also passes the pressure fluid to a release valve $f$ in the form of a spring-loaded ball valve which consists of a cylinder 66 in which a piston 67 is slidable in the longitudinal direction and acts through a compression spring 68 upon a valve ball 69 which normally shuts off the flow of pressure fluid from pressure line 11 into cylinder 66 and then to the return lines 70 and 21. Pressure line 11 further supplies pressure fluid through a branch line and a throttling orifice 71 into the side of cylinder 66 opposite to the side of piston 67 which faces toward spring 68. From this part of cylinder 66 a line 72 leads to the auxiliary control element $h$, the slide valve 73 of which is connected to the control rod 40 of the injection pump and is shifted by the latter when the normal injection limit is reached so that line 72 will then communicate with the return line 74 and 21. The particular position of the auxiliary slide valve 73 then determines the volume of the flow through the auxiliary control element $h$ and thus the drop in pressure.

As long as the auxiliary slide valve 73 shuts off the connection between lines 72 and 74, valve ball 69 of release valve $f$ is acted upon by the pressure of spring 68 and by the fluid pressure which has been passed through the throttling opening 71 to the rear side of piston 67. If, however, the auxiliary slide valve 73 forms a connection between lines 72 and 74 when the amount of fuel injected exceeds a normal limit, the pressure in cylinder 66 at the rear side of piston 67 will be reduced and the fluid pressure in line 11, while overcoming the force of spring 68 and any residual pressure which might still act upon piston 67, may then open the release valve $f$ so that the fluid pressure which is supplied to the pressure-regulating valve $b$ will be reduced, which means that the pressure upon the hydraulic piston $a$ will also decrease so that transmission 1 will be changed to a lower speed. If as the result hereof the auxiliary slide valve 73 then again shuts off the connection between lines 72 and 74, the pressure will again rise slowly at the rear side of piston 67, since the pressure fluid can only flow slowly through throttle 71 to this side of cylinder 66. Consequently, due to the resulting increase in pressure, the transmission will then again return to the transmission ratio as originally set but, because of the insertion of the auxiliary control element $h$ and throttle 71, this readjustment will occur after a certain delay. This has the advantage that any oscillations of the system will be completely avoided. Furthermore, by varying the tension of spring 68, it is possible to influence the extent and the beginning of the pressure reduction within certain limits.

FIGURES 6 and 7 illustrate two further embodiments of the invention, in which the pressure reduction which is produced by the auxiliary control element $h$ when the normal load upon the engine is being exceeded is not utilized directly upon the hydraulic piston of transmission 1, but indirectly insofar as this pressure reduction acts upon the adjustment of the two-armed lever 25 which is pivotably connected to the control rod 13. For this purpose, connecting element 29 which connects bell crank 30 to the two-armed lever 25 is provided in the form of a servo cylinder 80 which is pivotally connected at 28 to lever 25 and thus follows the movement of the latter. Cylinder 80 has slidably mounted therein a piston 81, the piston rod of which is pivotably connected to bell crank 30, that is, to control member $e$. Piston 81 is normally held in engagement with a stop 83 in cylinder 80 by a compression spring 82 which is likewise provided within the cylinder. Chamber 84 of the cylinder, which is closed at one side by piston 81 and faces toward lever 25, has a throttling bore 85 and is connected by a flexible conduit 86 with the auxiliary control element $h$ which is supplied with pressure fluid by pump 10 through a line 43. Slide valve 87 of the auxiliary control element $h$ is again connected to the control rod 40 of the fuel injection pump. As long as the normal limit of fuel is not injected into the engine, the fluid pressure which is supplied through line 43 is merely passed into recess 88 of slide valve 87 but it cannot flow out of the latter.

In order to insure that spring 82 in servo cylinder 80 will press piston 81 into engagement with stop 83 while the auxiliary slide valve 87 is still in the position in which it shuts off the connection between its annular recess 88 and the annular recess 89, cylinder chamber 84 and thus also line 86 must be relieved of pressure. This may be attained either by making the control piston of the auxiliary slide valve 87 of the same width as the annular recess 89 so that, as soon as piston 87 is shifted toward the left and the left control edge of piston 87 shuts off the connection between recesses 88 and 89, the right edge will open the connection between recess 89 and line 86 to a line 90 which is connected to the return line 21, or it may be attained by making the control piston of slide valve 87 of a greater width than recess 89, in which case line 90 is omitted, and cylinder chamber 84 will then be relieved of pressure through the throttling opening 85 as long as the fuel injection pump supplies the engine with less than the maximum amount of fuel. Therefore, as long as the engine does not operate under a full load, cylinder chamber 84 is not under pressure and spring 82 maintains piston 81 in constant engagement with stop 83. Servo cylinder 80 therefore acts in this case like a rigid connecting element 29.

If, however, the normal fuel injection limit is reached, the auxiliary slide valve 87 will shift so far toward the right, as seen in FIGURE 6, that the two annular recesses 88 and 89 will be connected with each other so that the pressure fluid which is supplied through line 43 can now pass—although throttled—through line 86 into the cylinder chamber 84 from which it may again gradually escape through the throttling bore 85 at a flow rate which, if desired, may be regulated. Thus, a fluid pressure is then built up in cylinder chamber 84 which acts against the pressure of spring 82 and shifts cylinder 80 toward the left until an equilibrium is again attained between the fluid pressure and the force of spring 82 which is increased in accordance with the distance which the cylinder has been shifted. The result of this movement of servo cylinder 80 is an adjustment of control rod 13 of the pressure-regulating valve $b$ just as if the gear ratio had been reduced arbitrarily by an adjustment of the control member $e$. The pressure-regulating valve $b$ operates at this time to serve the function of release valve $f$. The transmission is then geared down accordingly, whereby the torque available on the driven shaft 3 increases, while the speed of shaft 3 decreases. The power output available on shaft 3 therefore remains the same. If this downward adjustment of the transmission ratio is still not sufficient and the injection pump still has the tendency to increase the fuel injection, the auxiliary slide valve 87 will be shifted further toward the right (although only by fractions of a millimeter) so that still more pressure fluid can flow into cylinder chamber 84 and a higher pressure will be built up therein, since the amount discharged therefrom through the throttling opening 85 is limited. The result is a further displacement of cylinder 80 toward the left and a further reduction of the transmission ratio. In the event that the throttling opening 85 is omitted, the full amount of pressure fluid in chamber 84 will be available for shifting cylinder 80.

FIGURE 7 illustrates a modification of the invention which is very similar to the embodiment according to FIGURE 6, except for the design of the servo cylinder. In this case, the servo cylinder 80a is mounted in a fixed position and the relative movement of piston 81 which occurs when the admissible load limit of the combustion engine is exceeded, is made possible by the insertion of another connecting rod 91 into the connecting system leading from the control member $e$ to the two-armed lever 25 which is connected to control rod 13 of the pressure-regulating valve $b$. Control rod 13 is shifted toward the left to reduce the gear ratio if piston 81 is moved toward the left, since the connecting rod 91 then pivots about the pivot point 92. It is, on the other hand, also possible to carry out any desired manual adjustment of the pressure-regulating valve $b$ by means of the control member $e$, since in this case the connecting rod 91 will pivot about the pivot point 93.

Figure 8:
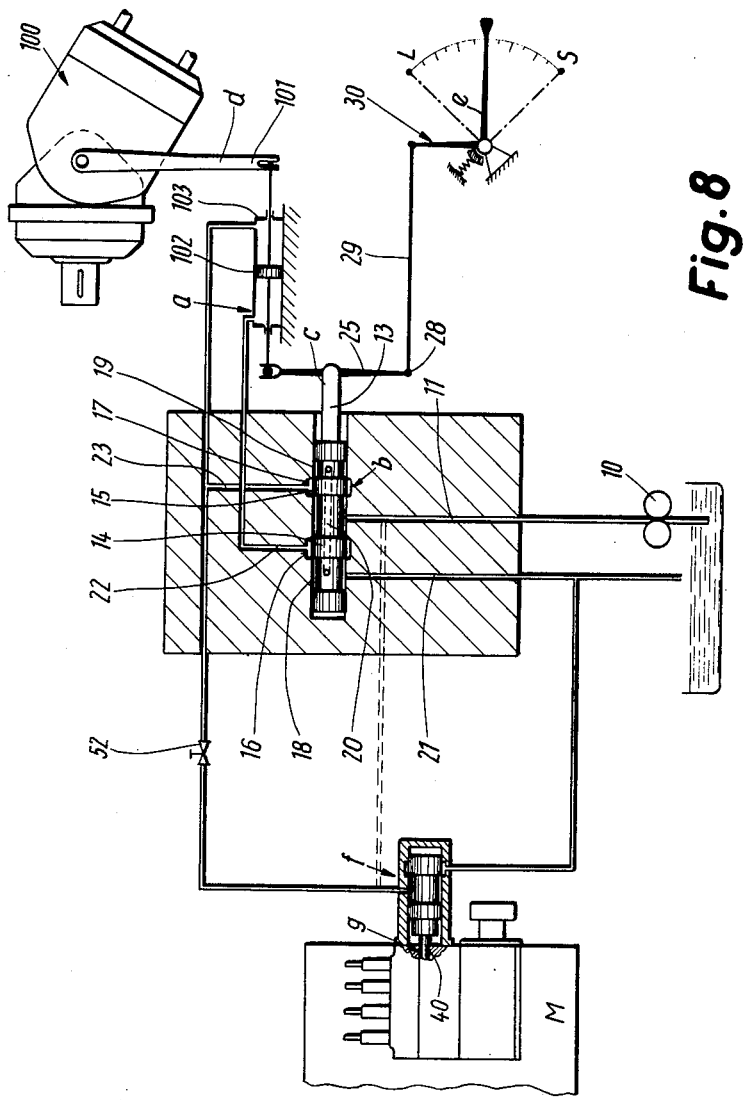
FIGURE 8 shows a diagrammatic illustration of the principles of construction of the control mechanism according to the invention in connection with an infinitely variable transmission of any kind.

FIGURE 8 finally shows diagrammatically that the control mechanism according to the invention as previously described may be employed not only in connection with conical pulley transmissions, but also with any other type of infinitely variable transmissions, provided that for maintaining a certain transmission ratio the respective transmission has some adjusting element $d$ on which a force must be applied which either depends upon the load upon the transmission or its transmission ratio or both. The infinitely variable transmission 100 as illustrated in FIGURE 8 is provided with a control element $d$ in the form of a transmission-ratio adjusting lever 101 on which the above-mentioned force would have to be applied. This may be done according to the invention by means of a servo piston 102 which is slidable longitudinally within a cylinder 103 and connected to the adjusting lever 101. Cylinder 103 is supplied at both sides of piston 102 with a pressure fluid by means of a pressure-regulating valve $b$ of the type as described. Control rod 13 of this pressure control valve is likewise connected to a two-armed lever 25 which is adjustable, on the one hand, by a control member $e$ to effect an arbitrary adjustment of servo piston 102 and thus of the transmission ratio of transmission 100, while, on the other hand, the two-armed lever 25 is also connected to the servo piston 102 so that any displacement of the piston will react upon the pressure-regulating valve $b$. A release valve $f$ lies in shunt to one of the pressure lines 22 and 23 leading from the pressure-regulating valve b to servo piston 102 or, as indicated in dotted lines, to line 11 leading from pump 10 to the pressure-regulating valve b. This release valve f will allow a throttled part of the pressure fluid with which it is supplied to flow off when the load limit of the engine is exceeded, so that the pressure of the pressure fluid will then be reduced with the result that the servo piston must shift to a new position of equilibrium between the fluid pressure acting upon this piston and the force exerted upon the adjusting lever 101, which can occur only as a result of a change in the transmission ratio of the transmission.

The control mechanism according to the invention as previously described with reference to different embodiments thereof is extremely sensitive since, due to the application of the edge-controlled pressure-regulating valves b and release valves f, very steep pressure changes occur even at extremely small displacements of the control pistons. The pressure-regulating valve b as well as the release valve f need an axial displacement of no more than a few tenths of a millimeter in order to vary the fluid pressure which is controlled by the edges of the pistons between zero and a maximum value.

Since the extent of the displacement of control rod 13 constitutes a measure according to which the transmission ratio of the transmission is changed, while the extent of the displacement of the slide member of the release valve f constitutes a measure according to which the normal output of the engine is changed, any unintentional changes of the transmission ratio of the transmission which might occur with the control mechanism according to the invention can only be extremely small and also any changes in the admissible load upon the engine can only be very small. Within this small range of the changes in the transmission ratio and the admissible load, the entire adjustment occurs, which means that the new control mechanism permits the admissible load upon the engine to change only by a fraction of one percent in order to effect the greatest possible change in the transmission ratio of the transmission. The admissible load of the driving engine can therefore never be exceeded as long as the infinitely variable transmission has not reached the end of its adjustment range.

The application of servo means further increases the sensitivity of the control mechanism as described since the control forces which react from the auxiliary control element h upon the control member g of the output control device of the engine are very small. Furthermore, a servo control also offers considerable advantages insofar as the design and construction of the control mechanism are concerned.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. In a control mechanism for operating a driving unit comprising a driving engine having an automatic governor with a movable control member for controlling the output of said engine, and an infinitely variable transmission connected to and driven by said engine having cylinder and piston means for varying the transmission ratio of said transmission, means for normally maintaining a constant transmission ratio comprising a source of fluid pressure medium, a line connecting said source to said cylinder and piston means, a pressure-regulating valve in said line for determining the pressure of said medium settable control means, a control member operatively connected to said valve and connected to said cylinder and piston means and to said control means for moving said valve in response to movement of said cylinder and piston means to maintain the same substantially constantly in a position determined by the setting of said control means, and a control element comprising a pressure release valve connected to said line operatively connected to said control member of said governor of said engine to be adjusted thereby when said engine has reached its normal maximum output for then reducing the pressure of said medium acting upon said cylinder and piston means to said transmission so as thereby to reduce the transmission ratio of said transmission.

2. In a control mechanism for operating a driving unit comprising a driving engine having an automatic governor with a movable control member for controlling the output of said engine, and an infinitely variable transmission connected to and driven by said engine having cylinder and piston means for varying the transmission ratio of said transmission, means for normally maintaining a constant transmission ratio comprising a source of fluid pressure medium, a line connecting said source to said cylinder and piston means, a cylinder in said line, a pressure-regulating valve in said cylinder for determining the pressure of said medium settable control means, a control member operatively connected to said valve and connected to said cylinder and piston means and to said control means for moving said valve in response to movement of said cylinder and pistons means to maintain the same substantially constantly in a position determined by the setting of said control means, and a control element comprising a pressure release slide valve operatively connected to said line connected to said automatic governor and adapted to be adjusted thereby when said engine has reached its normal maximum output, said cylinder having a return outlet, and a return line for said pressure medium connected to said return outlet of said cylinder, said slide valve being arranged in said return line partly to open said return outlet when the admissible load upon the engine is exceeded so as to reduce the pressure of said medium and its action upon said cylinder and piston means whereby the transmission ratio of said transmission is reduced.

3. A control mechanism as defined in claim 1, in which said source of pressure medium includes a pump for conveying said medium under pressure through part of said line to said pressure-regulating valve, said release valve lying in shunt to such part of said line.

4. A control mechanism as defined in claim 1, in which said release valve lies in shunt to the part of said line conducting said pressure medium from said pressure-regulating valve to said cylinder and piston means of said gear.

5. In a control mechanism for operating a driving unit comprising a driving engine and an infinitely variable transmission connected to and driven by said engine having cylinder and piston means operatively connected thereto for varying the transmission ratio of the transmission, said engine having means to supply fuel thereto and having speed-responsive means operatively connected to said fuel supply means and to the output of said engine for varying the supply of fuel in response to changes in speed output of the engine with constant accelerator setting, means for normally maintaining a constant transmission ratio comprising a source of fluid pressure medium, a line connecting said source to said cylinder and piston means, a pressure-regulating valve in said line for controlling the pressure of said medium, settable control means, a control member operatively connected to said valve, to said cylinder and piston means and to said settable control means, for moving said valve in response to movement of said cylinder and piston means to maintain said transmission ratio substantially constant at a value determined by the setting of said settable means, a control element comprising a pressure release valve operatively connected to said line, and means operatively connected to the speed-responsive means and to the pressure release valve to open said release valve when such speed drops below a predetermined value so as to reduce the transmission ratio of the transmission when the speed-responsive means reaches the position of maximum fuel supply.

6. A mechanism as claimed in claim 1 in which the pressure relief valve is operatively connected to the control member of the governor by servo means.

7. A control mechanism as defined in claim 6, in which said servo means comprises a control piston connected to said control member of said governor of said engine and adapted by its operative position to control the pressure of said pressure medium acting upon said release valve against the action of a spring.

8. A control mechanism as defined in claim 6, in which said servo means comprises an electric switch operatively connected to and actuated by said control member of said governor of said engine, and an electric auxiliary control circuit controlled by said switch, said release valve comprising a piston and a solenoid connected to said circuit for moving said piston.

9. In a control mechanism as claimed in claim 6, said first control means comprises a linkage connected at one end to said cylinder and piston means and having at the other end a control handle for varying said transmission ratio at will, a servo element in said linkage comprising a cylinder, a piston within said cylinder, and a spring, said cylinder and piston being slidable relative to each other against the action of said spring, said servo means comprising a slide valve mechanically connected to said control member of said governor of said engine and also connected by one line to said source of pressure medium and by another line to said cylinder of said servo element for conducting the pressure medium passed to said slide valve through said slide valve to said cylinder of said servo element when the normal maximum output of said engine is exceeded while said control handle remains in any adjusted position, said pressure-regulating valve which also acts as a pressure release valve is adjusted so as to effect a reduction in the transmission ratio of said gear.

10. A control mechanism as defined in claim 6, in which said servo means comprises a control piston connected to said control member of said governor of said engine and adapted by its operative position to control the pressure of a pressure medium, a second piston, and a spring engaged between said second piston and said pressure release valve, said controlled pressure medium acting upon said last piston, so that the pressure for opening said release valve is determined in accordance with the operative position of said second piston.

References Cited by the Examiner
UNITED STATES PATENTS

| 1,024,669 | 4/12 | Behr | 74—583 |
| 2,168,956 | 8/39 | Kohl | 74—190.5 |
| 2,656,733 | 10/53 | Dicke | 74—472 |
| 2,829,533 | 4/58 | Ballmer et al. | 74—472 |
| 2,982,147 | 5/61 | Panhard | 74—190.5 |
| 3,043,152 | 7/62 | Karig et al. | 74—230.17 |
| 3,052,132 | 9/62 | Dittrich et al. | 74—230.17 |

FOREIGN PATENTS 1,205,363 8/59 France.

OTHER REFERENCES

Popular Science, pages 140–142 and 226, December 1959, 74—190.5.

DON A. WAITE, *Primary Examiner.*